Aug. 26, 1930.  W. I. BALLENTINE  1,773,802
APPARATUS FOR TESTING HARDNESS
Filed March 14, 1927
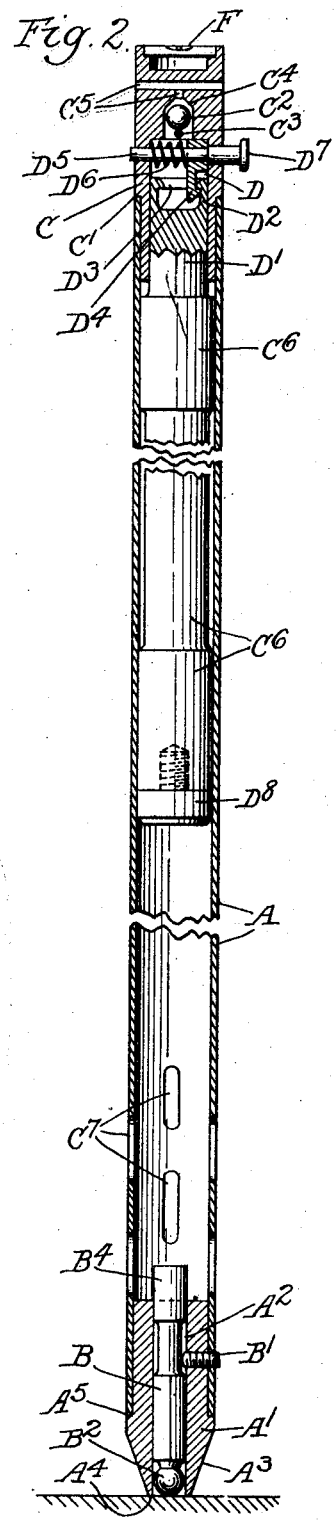
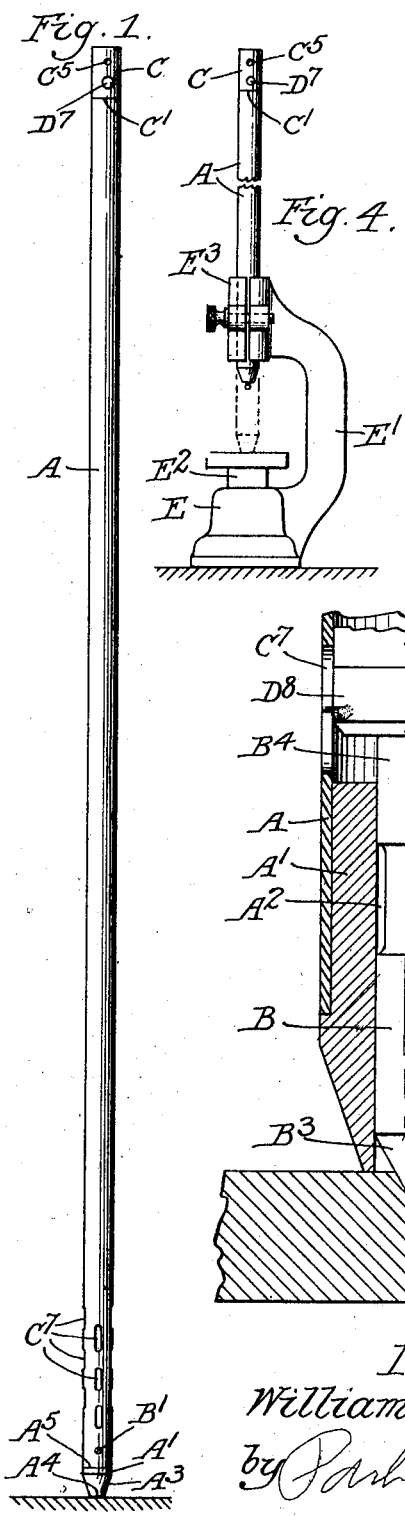
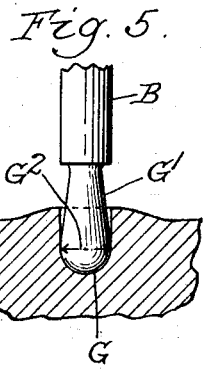
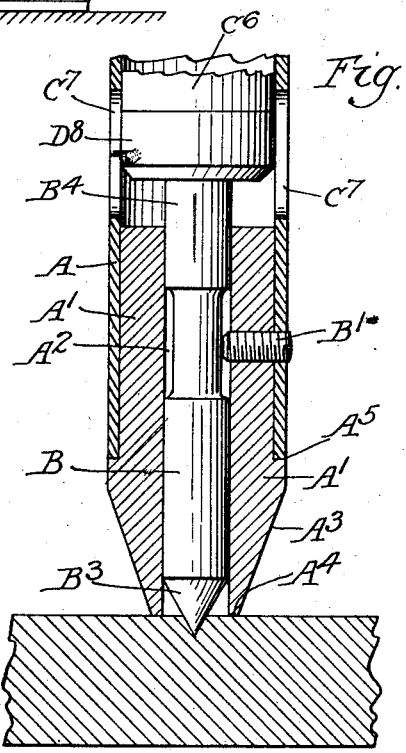
Inventor
William I. Ballentine
by Parker & Carter
Attorneys Patented Aug. 26, 1930

1,773,802

UNITED STATES PATENT OFFICE

WILLIAM I. BALLENTINE, OF LA PORTE, INDIANA

APPARATUS FOR TESTING HARDNESS

Application filed March 14, 1927. Serial No. 175,170.

My invention relates to a process and means for testing material and has for its primary object to determine the hardness of metals and other similar materials.

It has been proposed in the past to test the hardness of metals by indenting them by a tool exerting a predetermined pressure on the metal and then measuring the depth of the indentation resultant from this compression. It has also been proposed to measure the hardness of metal by measuring the height to which a hammer or projector falling upon the metal rebounds and in my two earlier patents, namely, No. 881,047 and No. 855,923 it has been proposed to measure the hardness of metal by the deformation of a crusher plate of soft metal interposed between the hammer and the material to be tested. All these devices have manifest difficulties. The apparatus for exerting a pressure is limited to situations where test specimens may be placed in a machine. The same is true in the apparatus for determining hardness by rebound and both these apparatuses require the presence of smooth and finished surfaces upon which to work. My earlier device can be applied to all types of material without the use of test specimens but it is exceedingly difficult to measure the deformation of the crusher block because the length of different deformations with varying hardness is owing to the necessary softness of the crusher block very slight and thus the most minute and accurate measurements must be made and temperature changes are likely to upset the whole system. I propose in my present invention to use a portable apparatus which may be placed into proper working relation with the material to be tested and where the material itself will be deformed by penetration resultant from a hammer blow under the force of gravity. Gravity being constant, the weight of the hammer being constant, the length of fall of the hammer being constant, it is possible to get accurate operation of the device and then it becomes necessary only to measure the width of the print of the plunger stroke by the hammer and driven into the material itself as soon as there is a wider range of operation of width of the impression with respect to the hardness of the material, it is much easier to take readings in the new device than in the old one. Other objects will appear from time to time throughout the specification and claim.

My invention is illustrated more or less diagrammatically in the accompanying drawings, wherein—

Figure 1 is a side elevation of a portable form of my apparatus;

Figure 2 is a longitudinal section on an enlarged scale;

Figure 3 is a detail showing the lower end of the device of the modified form of plunger;

Figure 4 is a side elevation on a reduced scale showing a bench form of my device;

Figure 5 shows a modified form of plunger tip.

Like parts are shown by like characters throughout the specification and drawings.

A is a tube which serves as a guide member or guide housing. $A^1$ is a plug closing the lower end of the tube. This plug is apertured at $A^2$ throughout its length, the aperture being concentric with the axis of the tube, the end of the plug where it projects beyond the tube being tapered as at $A^3$ terminating in annular surface $A^4$, the outer diameter of which is only a little greater than the inner diameter thereof. The plug is shouldered at $A^5$ so that the outside diameter of the plug is the same as the outside diameter of the tube and the plug may be held in the tube by any suitable means.

Slidable within the plug is a plunger B. This plunger is reduced intermediate its ends but at both ends is of such diameter as to make a smooth running fit in the aperture in the plug. $B^1$ is a set screw penetrating through the wall of the tube and the plug into the space occupied by the plunger and serving as a stop to limit the movement of the plunger by engagement with its enlarged end between predetermined limits, thereby permitting the plunger to be pressed back so that its lower material contacting end may be in the same plane as the annulus $A^4$ or so that it may penetrate into the material to be tested as indicated in Figure 3 without interference but the stop prevents its dropping out when the apparatus is lifted from the work. The plunger has at its lower end a hardened material contacting point or tip, for instance, a hardened steel ball $B^2$ or a conical point $B^3$ or any other suitable material contacting member which may or may not be removable from the plunger. The upper end of the plunger always projects as indicated at $B^4$ above the upper end of the plug $A^1$.

C is a plug shouldered at $C^1$ inserted in the upper end of the tube A. $C^2$ is a ball valve held in the plug C by means of a locking ring $C^3$. This ball valve is adapted when it engages the ring $C^3$ with the tube in the position shown in Figures 1 and 2 to fall back away from the seat $C^4$ and leave the air passage $C^5$ open to permit air to pass into the interior of the tube above the hammer $C^6$. Toward the lower end of the tube are a plurality of slots or openings $C^7$ to permit escape of air from below the hammer when the hammer makes its desired excursion.

The plug C is centrally apertured as at D and the hammer $C^6$ has a cylindrical extension $D^1$ adapted to penetrate within the aperture of the plug. This extension terminates in an annular ring $D^2$ with an interior flange $D^3$. This flange is adapted to be engaged by a latch $D^4$ mounted on the slidable pin $D^5$. This pin is held in the locking position by a spring $D^6$ but may be released by pressure on the latch head $D^7$ which will permit the hammer to fall. The hammer itself terminates at its lower end in a removable hammer head $D^8$ provided only to permit renewal thereof in the event that the hammer may pean out by contact with the plunger B and thereby interferes with the operation of the device.

E is a base, $E^1$ a supporting standard projecting upwardly from the base, $E^2$ an anvil on the base, $E^3$ a split sleeve carried by the standard in which the tube A may be slidably mounted, whereby the device may be set up for bench operation. F is a bull's eye spirit level in the upper end of the plug C whereby the tube A may be leveled. In the modified form shown in Figure 5 the plunger tip has a spherical contact surface G but the tip is relieved as at $G^1$ back of the maximum diameter of the tip at $G^2$ to prevent friction contact between the tip and the material.

The use and operation of my invention are as follows:

When the device is to be used as a portable tube for testing the hardness of materials which it is not convenient to bring into the laboratory, the operator cleans and smooths off with a file or otherwise a relatively small surface on the material or object to be tested. He then reverses the tube allowing the hammer to fall by gravity into the position shown in Figure 2 where it is engaged by the latch. The ball check valve causes the upper end of the tube and plug therein to serve as a dash pot and cushion the movement of the hammer toward the upper end and thereby preventing damage to the apparatus. The operator then places the tube in place with its lower end resting upon the smooth and cleaned surface to be tested. He levels it by means of the spirit level until the axis of the tube is vertical, then holding the tube vertical, he releases the latch, permits the hammer to fall. When this takes place the hammer strikes the upper end of the plunger and drives the lower end into the material as shown for instance in Figure 3. The penetration of the material contacting point or head into the material bears a direct relation to the hardness of the material and the operator then by measuring the width of the pattern made by the penetrating head is able to get a direct reading of the hardness of the material.

The apertures toward the lower end of the tube permit the escape of air from in front of the plunger and the check valve at the upper end dropping down as it does permits air to rush in behind the plunger. As a result, the plunger falls freely under the influence of gravity and as soon as the length of the tube is fixed and the weight of the plunger is fixed and the length of fall is also fixed so that the strength of the blow is always the same provided only that the operator is careful to accurately plumb the device. Thus there are no springs to calibrate and no pressure gauges to calibrate and all the operator has to do is to operate the device as indicated and measure the width of the pattern.

When the device is used for testing relatively soft materials, however, into which the plunger point may penetrate very deeply, it will be noted that a different type of plunger point or head is used having a spherical contact end but relieved away from the back of the maximum diameter so that there will be no friction between the point and the wall of the hole. Under these conditions the depth of penetration must be measured by any suitable depth gauge.

The upper end of the tube serves as a dash pot because when the tube is reversed and the hammer falls under gravity toward the latch while the valve closes the tube against free escape of air, there is an escape of air through the clearance between the hammer and the tube. Because the hammer must fall freely to make the test, there must be a considerable clearance between the parts and this clearance while it does not interfere with the free movement of the hammer enables the tube to guide the hammer and serves as an adequate space for the escape of air so that the fall of the hammer into the latched position is adequately cushioned.

I claim:

An apparatus for testing materials comprising a tubular guide housing, a plunger in the lower end thereof held in working relation therewith but free to move longitudinally independent of the movement of the housing, a hammer contained within the housing free to fall toward and come into direct contact with the inner end of the plunger, the outer end of the plunger being adapted to come into direct contact with the work to be tested, a latch contained at the upper end of the housing adapted to suspend the hammer at the upper end thereof, a latch releasing handle projecting through the wall of the housing, there being a plurality of relatively large air escape vents in the wall of the housing toward its lower end and a relatively smaller air intake vent at the upper end of the housing discharging thereinto above the hammer, and a check valve associated with such upper air vent adapted to leave the vent freely open on the descent of the hammer toward the lower end of the housing but to entirely close the vent on the movement of the hammer toward the upper end of the housing.

Signed at Chicago, county of Cook and State of Illinois, this 10th day of March, 1927.

WILLIAM I. BALLENTINE.